Jan. 26, 1937.  C. C. MILLER  2,069,173
REFINING HYDROCARBON GASES
Filed Nov. 25, 1933
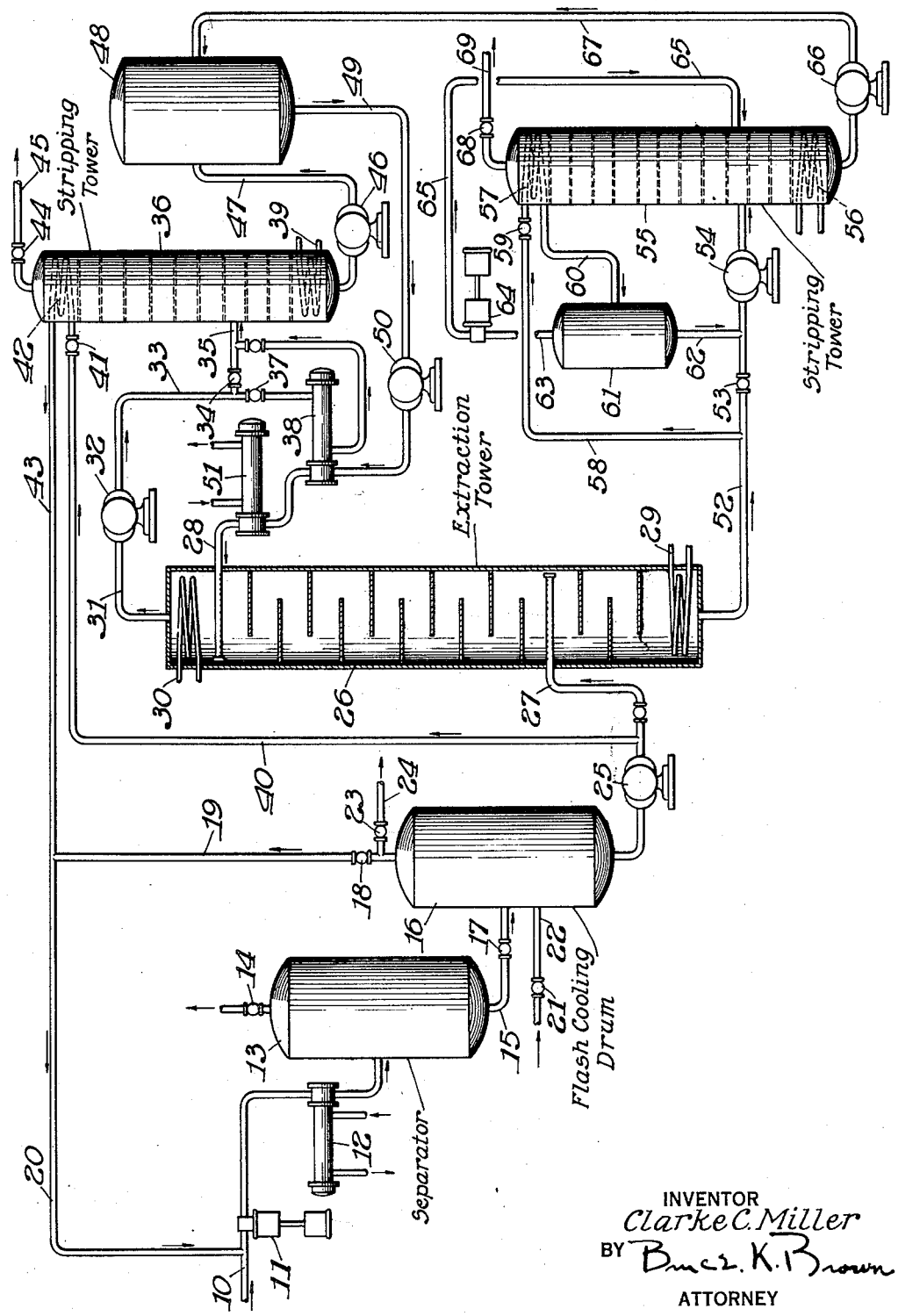
INVENTOR
*Clarke C. Miller*
BY *Bruce K. Brown*
ATTORNEY Patented Jan. 26, 1937

2,069,173

UNITED STATES PATENT OFFICE 2,069,173

REFINING HYDROCARBON GASES

Clarke C. Miller, Wood River, Ill., assignor to Standard Oil Company, Chicago, Ill., a corporation of Indiana Application November 25, 1933, Serial No. 699,668

5 Claims. (Cl. 196—13)

My invention relates to an improved process for separating liquefiable unsaturated gaseous hydrocarbons from liquefiable saturated gaseous hydrocarbons of the methane series.

Unsaturated gases, in particular olefinic gases of the ethylene series, are present in many commercial available gas mixtures but are ordinarily found associated with saturated gases of similar molecular weight from which they cannot be readily separated by physical means on account of the close similarity of their boiling points and other physical properties. These unsaturated or olefinic gases constitute valuable chemical raw materials if available in relatively pure form. Many attempts have, therefore, been made to develop methods for separating such mixtures but none of these attempts have been successful commercially.

For example, it has been proposed to separate gaseous olefins from saturated gases of similar molecular weight (i. e. containing the same number of carbon atoms) by scrubbing such mixtures in the gaseous state with various liquid scrubbing media, including aqueous solutions of certain inorganic salts, and various other solvents. None of these methods have been successful commercially.

I have discovered that if such gaseous mixtures be liquefied and extracted while in the liquid state with liquid sulfur dioxide, sharp separation of the olefins from the saturated materials is obtained and the olefins may be recovered in high yields and in substantially pure form.

The operation of my process is relatively simple. The mixture of gaseous hydrocarbons is compressed and cooled until liquefaction occurs. This liquid is further cooled if necessary to the desired extraction temperature, preferably performing this cooling by evaporation and self refrigeration. The mixture is then contacted in a suitable extractor, preferably operating on the counter-current principle, with liquid sulfur dioxide which has also been cooled to the desired extraction temperature. The extraction is carried out at a temperature below the so-called critical solution temperature for sulfur dioxide and the hydrocarbon mixture. This so-called critical solution temperature is the temperature above which liquid sulfur dioxide and the liquefied gaseous hydrocarbons are miscible in all proportions. The extraction step is carried out under sufficient pressure to maintain the sulfur dioxide and the hydrocarbons under treatment in the liquid form at the extraction temperature.

The ratio of liquid sulfur dioxide to liquefied hydrocarbons is so chosen that at the temperature employed two separate phases are obtained. One of these phases will consist mainly of liquid sulfur dioxide containing dissolved olefins or unsaturated hydrocarbons but only slight proportions of dissolved saturated hydrocarbons. The other phase will consist mainly of liquefied saturated hydrocarbons containing certain amounts of dissolved sulfur dioxide and relatively small proportions of dissolved olefinic or unsaturated hydrocarbons. These two phases are removed separately from the extractor and separately treated so as to recover sulfur dioxide from hydrocarbons, the sulfur dioxide being returned to the process. By this means, as before stated, the gaseous olefins are obtained at relatively high purity and with a high percentage recovery.

As an example of the use of my process the following data may be cited. Using a mixture of propane and propylene containing approximately 25.6% propylene by volume, 1035 grams of this mixture in liquefied form was extracted with 2495 grams of sulfur dioxide at —60° F. in a batch pressure vessel. After separation of the resultant two liquid phases and removal of sulfur dioxide from each of these phases, the products consisted of 196 grams of a hydrocarbon mixture containing 67.4% olefins by volume and 838 grams of a hydrocarbon mixture containing only 16.0% olefins. By carrying out such extraction in continuous counter-current fashion much higher yields and higher concentrations of olefins are obtained.

I have also found that it is sometimes desirable to carry out this extraction with mixed solvents, i. e. liquid sulfur dioxide plus a suitably selected organic solvent. Suitable secondary solvents may include aliphatic alcohols such as methyl alcohol, ethyl alcohol, propyl alcohol, butyl alcohol, diacetone alcohol, the secondary and tertiary homologues of the foregoing aliphatic alcohols and the polyhydric alcohols such as ethylene glycol, diethylene glycol, and glycerine. Alkyl esters of organic acids such as ethyl acetate, butyl phthalate, dimethyl phthalate, butyl acetate, and ethyl butyrate may be used. Various chlorinated derivatives of aliphatic oxygen compounds may also be used such as $\beta\beta$-dichlordiethylether, ethylene, propylene or butylene chlorhydrins, $\beta$-chlorethylmethyl ether. Certain basic aromatic nitrogen-containing compounds may also be used as secondary solvents including pyridine, toluidine, methyl-pyridine, methyl and dimethyl aniline, and chloro aniline. Phenolic compounds may be used including phenol, cresol, xylenol, ethyl phenol, propyl phenol, chloro phenol. Aromatic nitro compounds are useful as secondary solvents, as for example, nitro benzol, mono-nitro, toluene, mono-nitro xylene, etc. In some cases I may also use furfural as a secondary solvent. I may also use two or more of the above secondary solvents in admixture with liquid sulfur dioxide. An additional requirement upon a secondary solvent for use in my process is that it shall be miscible with liquid sulfur dioxide in the desired proportions at the desired operating temperature.

In addition to such solvents as the foregoing, which themselves have an active solvent power for liquefied gaseous olefins when used alone and which apparently continue to exert said powers when used in admixture with liquid sulfur dioxide, I have also found that certain materials which, when used alone, have little or no effective selective solvent power on liquefied gaseous olefins, exert a beneficial effect when used in admixture with liquid sulfur dioxide. Such materials include benzene, toluene, xylene and various of the light fractions of petroleum oil such as light or heavy naphtha and preferably light or heavy cracked naphtha. I may also use a mixed solvent consisting of liquid sulfur dioxide admixed with carbon dioxide.

In the operation of my process, using liquid sulfur dioxide alone, I preferably use approximately one volume of solvent to one volume of the liquefied mixture of olefinic and saturated hydrocarbons. I may, however, use as little as approximately 0.5 volume of solvent or as much as 3.0 volumes of solvent or thereabouts. The amount of solvent used will depend to a large extent upon the concentration of olefins in the original mixture and the purity desired in the final olefinic product.

Using liquid sulfur dioxide alone the extraction temperature must be below approximately 0° F. which represents the critical solution temperature for liquid sulfur dioxide and a liquefied mixture of propanepropylene. The critical solution temperature for other mixtures of liquefied hydrocarbon gases will be somewhat different from this value. The only definite limitation on the upper extraction temperature is that the extraction must be carried out at a temperature below the critical solution temperature for liquid sulfur dioxide and the particular mixture of liquefied hydrocarbons under treatment. The lower limit for the extraction temperature is ordinarily −60° F.

Using liquid sulfur dioxide mixed with an additional solvent or diluent I ordinarily use from 0.25 to 2.0 volumes of the secondary solvent per volume of liquid sulfur dioxide and ordinarily use from about 0.5 to 3.0 volumes of total solvent per volume of liquefied hydrocarbons. The extraction temperature using mixed solvents may in some cases be higher than that permissible with liquid sulfur dioxide alone, being in all cases limited by the critical solution temperature for the particular mixture of hydrocarbons and the particular mixed solvent in use.

I have previously briefly described the operation of my process which may be described more fully as follows:

Referring to the drawing attached hereto and which forms a part of this specification, this represents a diagrammatic elevational view of apparatus suitable for carrying out my process.

A mixture of gaseous olefinic and saturated hydrocarbons enters the system through line 10 and is compressed by compressor 11 to a pressure up to about 300 lbs. per sq. in. or sufficient, after cooling in cooler 12, to liquefy the liquefiable gases present. The compressed and partially liquefied gases are then passed into separator 13 where any unliquefied gases are withdrawn through valve 14. The liquefied gases are then passed through line 15 into flash cooling drum 16, the pressure being reduced slightly at valve 17 so as to permit partial evaporation for the purpose of self-refrigerating the liquefied materials. The gases formed by vaporization in drum 16 are removed through valve 18 and passed through line 19 and line 20 to the inlet of compressor 11, this being reliquefied and returned to the system. By this means the temperature of the liquefied materials in drum 16 is reduced to a temperature equal to or below the desired extraction temperature. Drum 16 may also be supplied with previously liquefied gases from an external source, such as a pressure distillate stabilizer operated in conjunction with a cracking system, in which case the liquefied gases are supplied through valve 21 in line 22 and the gases formed in drum 16 by vaporization may be removed through valve 23 in line 24 and returned to a suitable point in the external system.

Cooled liquefied materials are withdrawn from drum 16 by pump 25 and are introduced into vertical extraction tower 26 through line 27 which is positioned at an intermediate low point therein. In tower 26 the liquefied hydrocarbon materials rise by differential gravity action being displaced by the heavier solvent introduced into tower 26 through line 28 at an intermediate high point in the tower, and are thus counter-currently contacted with the solvent. Tower 26 may also be provided with bottom cooling coil 29 and top cooling coil 30 whereby improved separation may be attained. Pressure sufficient to maintain the hydrocarbons and the sulfur dioxide in liquid form at the extraction temperature is maintained on tower 26.

From the top of tower 26 undissolved liquefied hydrocarbons of predominately saturated character containing a certain amount of solvent dissolved therein are removed through line 31 and are pumped by pump 32 through line 33 and valve 34 in line 35 to stripping tower 36. A part of this material may be diverted through valve 37, passing through heat exchanger 38 in heat exchange relationship with stripped solvent entering tower 36, whereby the solvent is cooled. Pressures in tower 36 may be essentially the same as that in extraction tower 26 or may be appreciably higher or lower. This will depend on the hydrocarbon mixture under treatment and upon whether the liquid sulfur dioxide is used alone as a solvent or is used in admixture with some heavier solvent material. Tower 36 is provided with heating coil 39 or equivalent heating means in the lower part thereof and is provided with suitable cooling or reflux means in the upper part thereof which may include means for supplying open reflux to the tower. In the drawing I have illustrated one possible means for cooling the top of tower 36 which comprises withdrawing a small proportion of the liquefied gas from line 27 before it enters extraction tower 26, passing same through line 40 and expanding at valve 41 through cooling coils 42 in tower 36 and returning the expanded vapor through line 43 and line 20 to the inlet of compressor 11. Hydrocarbon vapors are removed from stripping tower 36 through valve 44 in line 45 and may be used as fuel or for any other purposes. Another factor which may control the temperature and pressure under which tower 36 is operated is the use to which these hydrocarbons are to be put. In other words, if these hydrocarbons are desired in final liquid form the tower may be operated at relatively high temperatures and pressures so that the hydrocarbon vapors removed overhead may be reliquefied by simple cooling. The stripped solvent is withdrawn from the bottom of tower 36 by pump 46 and passes through line 47 to solvent storage drum 48. Cooling means (not shown) may be provided in line 47 before and/or after pump 46.

I do not, of course, limit myself to this particular arrangement of apparatus since it is possible that in using liquid sulfur dioxide alone with a hydrocarbon mixture consisting originally mainly of butane-butylene but with small amounts of higher boiling materials, that the sulfur dioxide will be removed from tower 36 as an overhead product instead of a bottom product as shown. In this case it is obviously necessary to use a different arrangement of piping than that shown in the attached drawing. Furthermore, if I apply my process to separation of propylene-butylene from propane-butane, all four components being present in the original mixture, I must use a more elaborate fractionating system to separate the products from the liquid sulfur dioxide.

From drum 48 the solvent is returned to the extraction step thru line 49 and pump 50 thru interchanger 38 wherein it is cooled and if necessary is then passed through cooler 51 wherein it is cooled to a temperature approximately equal to or lower than that which it is desired to maintain in extraction tower 26.

Returning to extraction tower 26 the solvent plus desired dissolved olefins is removed from the bottom through line 52 and passes thru valve 53 to pump 54 to stripping tower 55. Tower 55, as has been previously stated with respect to similar tower 36, may be operated at various temperatures depending on the materials under treatment and at correspondingly chosen pressures which may be higher or lower than that prevailing in extraction tower 26. Tower 55 is provided with heating means 56 in the base thereof and is provided with suitable cooling or reflux means, which may include open reflux, in the upper part thereof. In the drawing I have illustrated a cooling coil 57 in the upper part of tower 55 which is cooled by withdrawing a part of the solvent plus dissolved liquefied olefin gas from line 52 through line 58, expanding same at valve 59 to provide a refrigerant effect in coil 57, passing expanded products through line 60 to separator 61 from which the unvaporized material passes through line 62 to the inlet of pump 54, while vaporized gases are withdrawn through line 63, recompressed by compressor 64 and passed thru line 65 to an intermediate point in stripping tower 55. Line 65 may be provided with cooling means (not shown) or these vapors may be introduced into tower 55 while in the vaporous state.

Stripped solvent is removed from the base of tower 55 by pump 66 and passes through line 67 to storage drum 48. Olefinic gases are removed from tower 55 through valve 68 in line 69 after which they are stored or utilized for desired purposes.

As previously stated with respect to tower 36, the temperatures and pressures used in tower 55 will be in part governed by whether or not the final olefinic products are desired in gaseous or in liquefied form. As previously stated, under certain circumstances it is also possible that tower 55 may be operated so as to remove sulfur dioxide as an overhead product, reliquefying same externally by cooling and/or recompressing while desired olefinic products are removed from tower 55 as a bottom product. Stripping towers 36 and 55 may also be supplemented by scrubbers wherein the hydrocarbon products are washed or treated with caustic or other chemical agents to remove final amounts of sulfur dioxide therefrom in which case the sulfur dioxide so removed is regenerated and returned to the system.

In some cases if saturated hydrocarbons free from olefins are desired as a product, it may be necessary or desirable to supplement the sulfur dioxide extraction with an acid treatment to remove the last traces of unsaturated hydrocarbons from the paraffinic fraction. Also, in some cases, the reaction products formed by acid treatment may have a special utility. When acid treating is employed, I prefer to carry it out in the liquid phase and at low temperatures rather than by the old methods of bubbling the gases through the acid. The liquid phase acid treatment does not possess the advantages of the liquefied sulfur dioxide extraction treatment as far as the recovery of gaseous olefins is concerned, but it may well supplement the extraction process and it may be particularly useful when reaction products brought about by contact with the acid are desired.

The gaseous mixtures to which my process may be applied may be any mixture of normally gaseous unsaturated and paraffinic hydrocarbons which may be liquefied and maintained in liquid form under the prevailing temperature and pressure in my extraction system. This includes ethane, propane, butane or any of them including their isomers in admixture with ethylene, propylene, butylene or any of them including isomers. Small amounts of higher boiling materials may also be present. Ordinarily, however, my process is particularly applicable to mixtures wherein the olefinic and paraffinic hydrocarbons contain the same number of carbon atoms. Diolefinic gases and acetylenic gases may also be separated from saturated gases. I may also separate diolefins from olefins, or acetylenic gases from olefins.

It will be understood that whereas the foregoing is a full and complete description of my invention I am not limited therein except as expressed in the claims as follows.

I claim:

1. The process of separating normally gaseous unsaturated hydrocarbons from normally gaseous saturated hydrocarbons, which comprises liquefying a mixture thereof, extracting said liquid mixture with liquid sulfur dioxide while under pressure sufficient to maintain the hydrocarbons in liquefied form, and separating the solvent and hydrocarbons in solution therein from the remainder of the liquefied hydrocarbons prior to any distillatory step.

2. The process of separating normally gaseous unsaturated hydrocarbons from normally gaseous saturated hydrocarbons, which comprises liquefying a mixture thereof, extracting said liquid mixture with a mixture of liquid sulfur dioxide and an organic solvent selected from the class of aliphatic alcohols, polyhydric alcohols, alkyl esters of organic acids, chlorinated derivatives of aliphatic oxygen compounds, basic aromatic nitrogen compounds, phenolic compounds, aromatic nitrogen compounds and furfural while under pressure sufficient to maintain the hydrocarbons in liquefied form, and separating the solvent and hydrocarbons in solution therein from the remainder of the liquefied hydrocarbons prior to any distillatory step.

3. The process of separating normally gaseous unsaturated hydrocarbons from normally gaseous saturated hydrocarbons, which comprises liquefying a mixture thereof, extracting said liquid mixture with a mixture of liquid sulfur dioxide and a phenolic compound while under pressure sufficient to maintain the hydrocarbons in liquefied form, and separating the solvent and hydrocarbons in solution therein from the remainder of the liquefied hydrocarbons prior to any distillatory step.

4. The process of separating normally gaseous unsaturated hydrocarbons from normally gaseous saturated hydrocarbons, which comprises liquefying a mixture thereof, extracting said liquid mixture with a mixture of sulfur dioxide and a liquid aromatic hydrocarbon while under pressure sufficient to maintain the hydrocarbons in liquefied form, and separating the solvent and hydrocarbons in solution therein from the remainder of the liquefied hydrocarbons prior to any distillatory step.

5. In the process of separating unsaturated normally gaseous hydrocarbons from mixtures of hydrocarbon gases, the improvement which comprises liquefying said gas mixture at a low temperature between 0 and —60° F., intimately contacting said liquefied gas mixture with liquid sulfur dioxide while maintaining said low temperature, separating said liquid sulfur dioxide containing dissolved olefin hydrocarbons from said liquefied hydrocarbon gases without substantial vaporization thereof and thereafter recovering said sulfur dioxide from said dissolved olefin hydrocarbons and from said undissolved hydrocarbon gas mixture by fractional distillation.

CLARKE C. MILLER.